United States Patent
Li et al.

(10) Patent No.: US 9,892,027 B2
(45) Date of Patent: Feb. 13, 2018

(54) EVENT-DRIVEN SOFTWARE TESTING

(71) Applicant: FUJITSU LIMITED, Kawasaki-shi, Kanagawa (JP)

(72) Inventors: Guodong Li, San Jose, CA (US); Indradeep Ghosh, Cupertino, CA (US)

(73) Assignee: FUJITSU LIMITED, Kawasaki (JP)

( * ) Notice: Subject to any disclaimer, the term of this patent is extended or adjusted under 35 U.S.C. 154(b) by 173 days.

(21) Appl. No.: 14/327,483

(22) Filed: Jul. 9, 2014

(65) Prior Publication Data

US 2016/0011959 A1    Jan. 14, 2016

(51) Int. Cl.
   *G06F 11/36*    (2006.01)

(52) U.S. Cl.
   CPC .................. *G06F 11/3684* (2013.01)

(58) Field of Classification Search
   USPC ........................................ 714/38.1
   See application file for complete search history.

(56) References Cited

U.S. PATENT DOCUMENTS

| | | | | |
|---|---|---|---|---|
| 6,353,896 B1* | 3/2002 | Holzmann | ............... | G06F 8/436 714/38.1 |
| 6,687,834 B1* | 2/2004 | Morales, Jr. | ........ | G06F 11/3664 705/24 |
| 7,647,219 B2* | 1/2010 | Overturf | ............. | G06F 11/3688 703/16 |
| 7,779,302 B2* | 8/2010 | Fung | ................... | G06F 11/3672 714/38.1 |
| 2004/0225919 A1* | 11/2004 | Reissman | ........... | G06F 11/3604 714/38.12 |
| 2005/0166179 A1* | 7/2005 | Vronay | .................. | G06Q 10/00 717/105 |
| 2007/0157169 A1* | 7/2007 | Chen | ........................ | G06F 8/74 717/120 |
| 2007/0280453 A1* | 12/2007 | Kelley | .................... | H04L 67/16 379/201.01 |

(Continued)

OTHER PUBLICATIONS

Pacheco, C., Lahiri, S.K., Ernst, M.D., Ball, T.: Feedback-directed random test generation. In: ICSE 2007, Proceedings of the 29th International Conference on Software Engineering, Minneapolis, MN, USA, May 23-25, 2007.

(Continued)

*Primary Examiner* — Kamini Patel
(74) *Attorney, Agent, or Firm* — Maschoff Brennan

(57) ABSTRACT

A method may include determining sequence-execution constraints that constrain execution orders of a plurality of events of an event-driven software application. The method may also include determining sequence-position constraints that constrain positions of the plurality of events in one or more possible event sequences of the plurality of events. Further, the method may include determining event-relation constraints that each indicates a relationship between an event input and an event output of each of the plurality of events. Moreover, the method may include forming a constraint set that enumerates the one or more possible event sequences and that includes the sequence-execution constraints, the sequence-position constraints, and the event-relation constraints. In addition, the method may include encoding control flow information of the one or more possible event sequences into the constraint set.

16 Claims, 4 Drawing Sheets

(56) References Cited

U.S. PATENT DOCUMENTS

| | | | | |
|---|---|---|---|---|
| 2008/0307264 | A1* | 12/2008 | de Halleux | G06F 11/3688 714/38.1 |
| 2009/0228871 | A1* | 9/2009 | Edwards | G06F 21/577 717/128 |
| 2010/0306590 | A1* | 12/2010 | Anand | G06F 11/3692 714/32 |
| 2012/0017119 | A1* | 1/2012 | Ghosh | G06F 11/3684 714/38.1 |
| 2013/0124265 | A1* | 5/2013 | Whitehair | G06Q 10/067 705/7.36 |
| 2014/0143604 | A1* | 5/2014 | Li | G06F 11/3684 714/38.1 |
| 2014/0157242 | A1* | 6/2014 | Campbell | G06F 11/366 717/131 |
| 2015/0293831 | A1* | 10/2015 | Li | G06F 11/36 717/124 |

OTHER PUBLICATIONS

S. Artzi, J. Dolby, S. Jensen, A. Mø,ller and F. Tip, &ldquo,A Framework for Automated Testing of Javascript Web Applications, &rdquo, Proc. Int',l Conf. Software Eng., (2011).

Guodong Li , Ganesh Gopalakrishnan, Scalable SMT-based verification of GPU kernel functions, Proceedings of the eighteenth ACM SIGSOFT international symposium on Foundations of software engineering, Nov. 7-11, 2010.

Sinha, N., Wang, C.: Staged concurrent program analysis. In: FSE (2010).

* cited by examiner

EVENT-DRIVEN SOFTWARE TESTING

FIELD

The embodiments discussed herein are related to testing event-driven software.

BACKGROUND

Testing software, such as validating or verifying software, is a common activity among information technology (IT) organizations. For example, whether the software is a desktop application for execution at one or more client computer systems, mobile device application for execution on a mobile device, or a web application for execution at one or more server computer systems, it is often important to verify the quality of the software. While some types of errors in software cause only annoyance or inconvenience to users, other types of errors have the potential to cause other problems, such as data and financial loss.

One type of software that is becoming more ubiquitous is event-driven software such as graphical user interface (GUI) based applications and web based applications. In event-driven software, the flow of the software may be determined by events such as user actions (mouse clicks, key presses), sensor outputs, or messages from other programs/threads. Event-driven software may have a large number of different events and corresponding event sequences that may be explored during testing. Often, a large number of events and event sequences may create an event sequence explosion. The event sequence explosion may result in the testing of the event-driven software being time consuming and/or resource intensive. In some instances, the amount of processing required from an event sequence explosion may be prohibitive in performing the testing.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include determining sequence-execution constraints that constrain execution orders of a plurality of events of an event-driven software application. The method may also include determining sequence-position constraints that constrain positions of the plurality of events in one or more possible event sequences of the plurality of events. Further, the method may include determining event-relation constraints that each indicates a relationship between an event input and an event output of each of the plurality of events. Moreover, the method may include forming a constraint set that enumerates the one or more possible event sequences and that includes the sequence-execution constraints, the sequence-position constraints, and the event-relation constraints. In addition, the method may include encoding control flow information of the one or more possible event sequences into the constraint set The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein relate to methods and systems of testing event-driven software applications, such as graphical user interface (GUI) based applications for electronic devices and web based applications. The flow of event-driven software applications may be determined by different "events" such as user actions (mouse clicks, key presses), sensor outputs, or messages from other programs/threads. Event-driven software applications may have a large number of different events and corresponding event sequences that may be explored during testing, which may lead to an event sequence explosion problem when analyzing the event-driven software applications.

As detailed below, in order to reduce the number of event sequences that may be explored, different types of constraints that are associated with events and event sequences of an event-driven software application may be determined to form a constraint set. The constraint set may enumerate possible event sequences for the event-driven software application as constrained by the different constraints. The constraint set may then be solved using a constraint solver. Further, a series of event sequences (referred to hereinafter as "an event space") of the event-driven software application may be explored based on the constraint solving. Such a process may reduce the number of event sequences that may be explored otherwise such that problems associated with event sequence explosion may be at least partially avoided.

Embodiments of the present disclosure are explained with reference to the accompanying drawings.

Figure 1A:
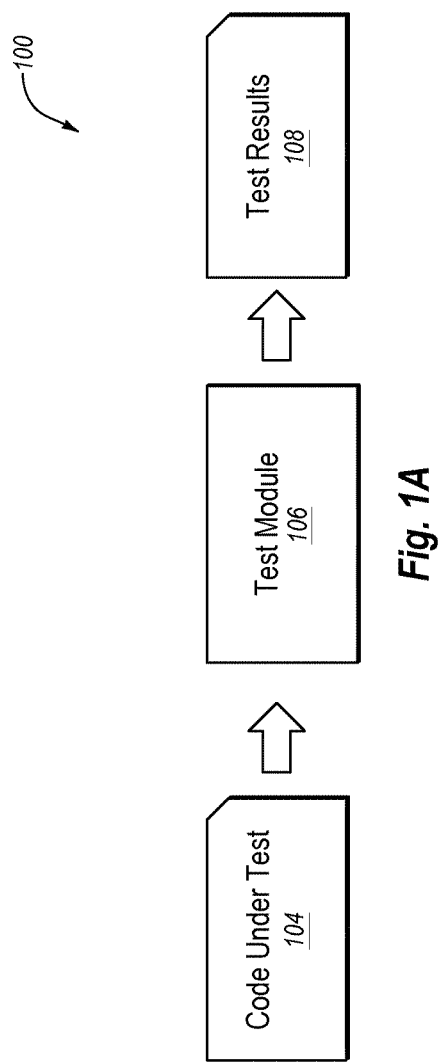
FIG. 1A is a diagram representing an example system configured to test software.

FIG. 1A is a diagram representing an example system 100 configured to test event-driven software, arranged in accordance with at least one embodiment described herein. The system 100 may include a test module 106 configured to perform testing with respect to code under test 104 of an event-driven software application to generate test results 108 of the event-driven software application. The code under test 104 may include electronic data, such as, for example, the event-driven software application, code of the event-driven software application, libraries, applications, scripts, or other logic or instructions for execution by a processing device. In some embodiments, the code under test 104 may include a complete instance of the event-driven software application. In these or other embodiments, the code under test 104 may include a portion of the event-driven software application.

The code under test 104 may be written in any suitable type of computer language that may be used for event-driven software applications.

The code under test 104 may include portions of the software program organized into a number of software modules. The software modules may include code that performs specific functionalities of the software modules. Code that performs specific functionalities may be referred to as software functions. In some embodiments, the code under test 104 may execute one or more software functions in response to an occurrence of an event associated with the event-driven application. For example, the code under test 104 may include a software function "f1(a)" that may perform operations with respect to a variable "a" in response to an event "e1."

Figure 2:
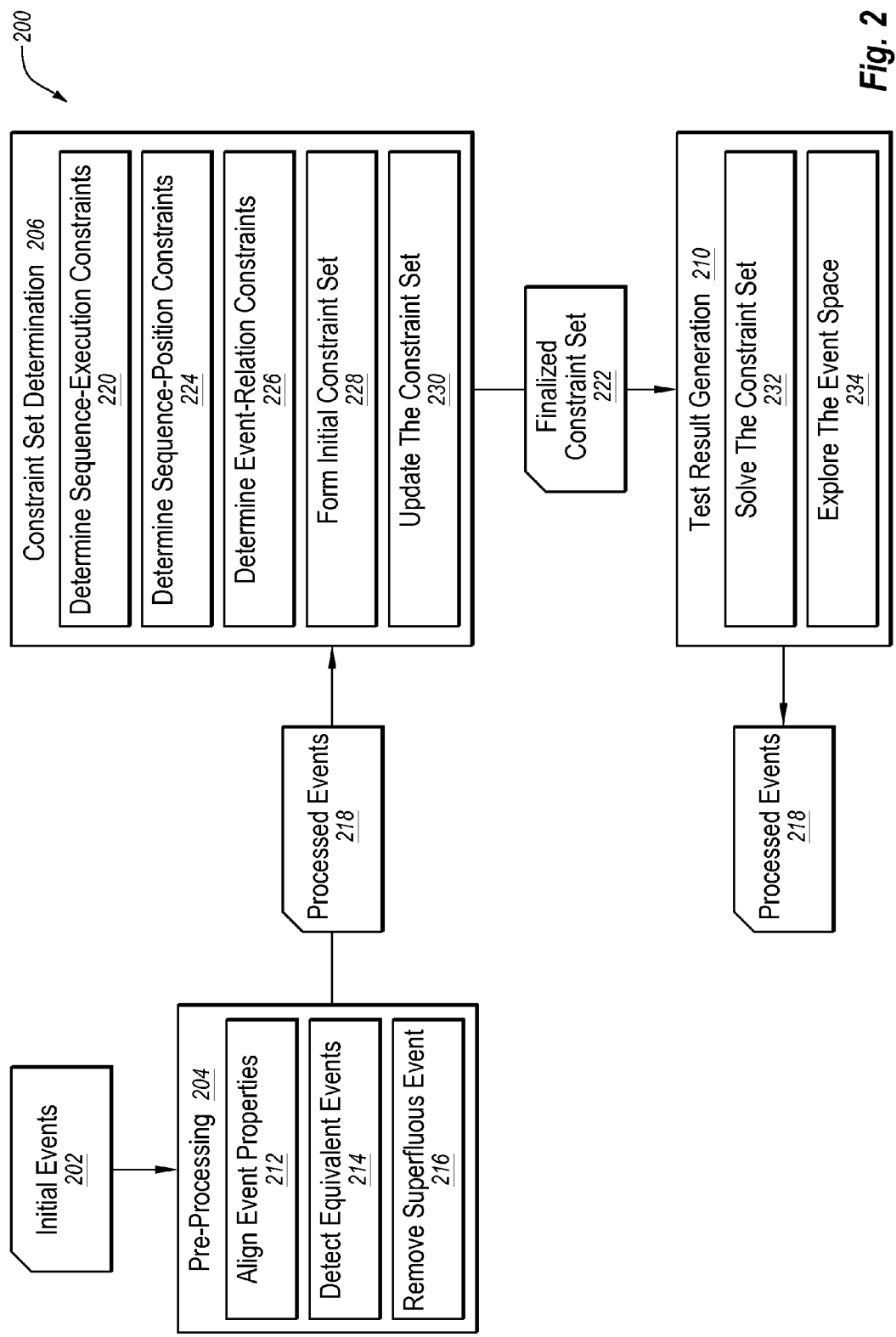
FIG. 2 is a diagram of an example flow that may be used with respect to testing event-driven software applications.
Figure 3:
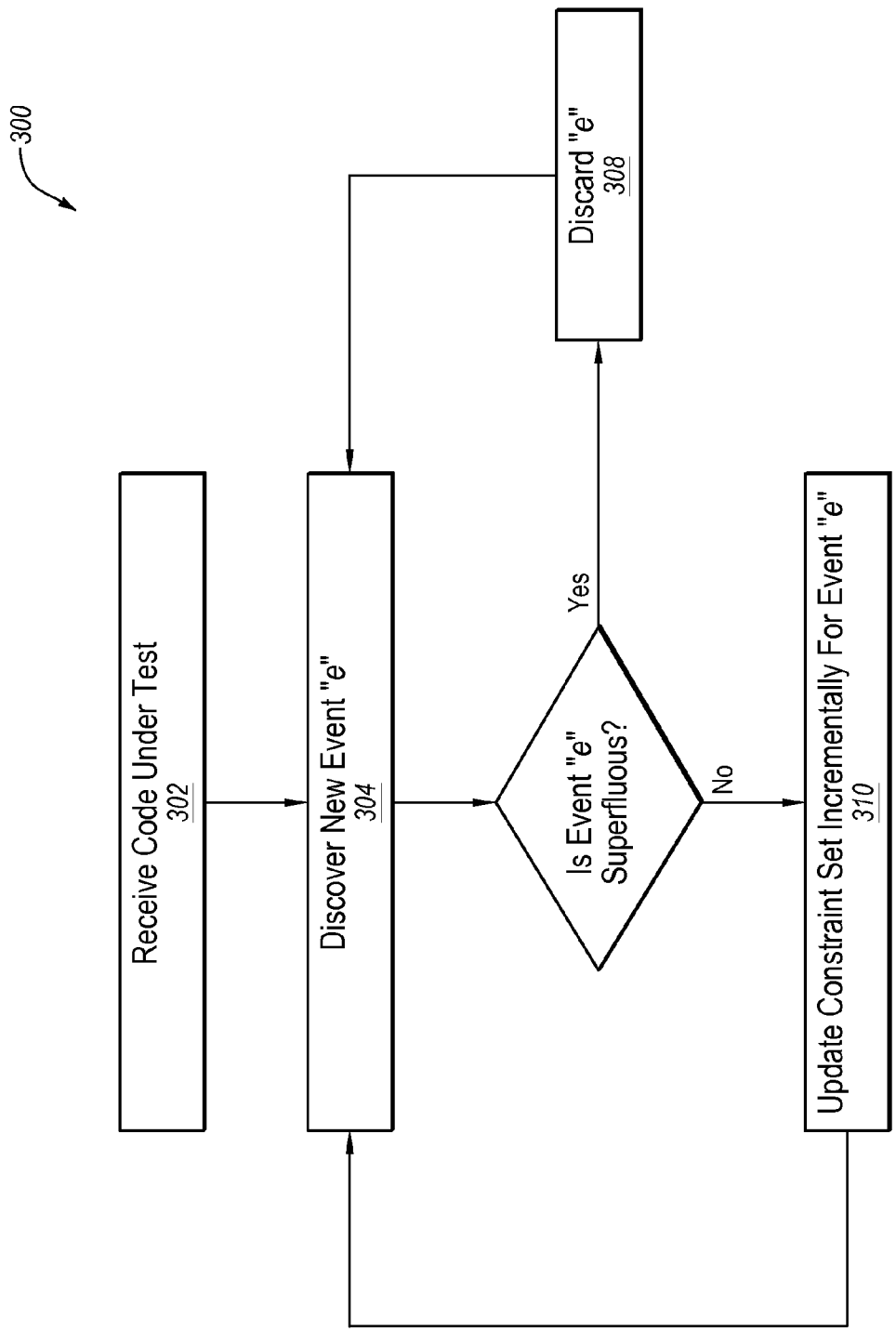
FIG. 3 is a flowchart of an example method 300 of updating a constraint set incrementally.

As detailed below, the test module 106 may be configured to perform a series of operations with respect to the code under test 104 that may help with testing the code under test 104. For example, the test module 106 may be configured to determine different types of constraints that may be associated with event sequences of the code under test 104. The test module 106 may also determine and generate a constraint set that may enumerate possible event sequences for the code under test 104 based on the different constraints. In some of these embodiments, the test module 106 may be configured to solve the constraint set using a constraint solver. Additionally, in some embodiments, the test module 106 may be configured to explore an event space of the code under test 104 based on the constraint solving. In these or other embodiments, the test module 106 may be configured to determine whether one or more queries associated with the code under test 104 are satisfiable via the exploration of the event space based on the constraint solving. FIGS. 2 and 3 described in detail below, describe example operations that may be performed to generate the constraint set and perform event space exploration.

In some embodiments, the test module 106 may be configured to produce test results 108 from testing the code under test 104. The test results 108 may indicate whether specific queries of the code under test 104 have been determined to be satisfiable or unsatisfiable based on the event sequence exploration. In these or other embodiments, the test module 106 may generate one or more solutions for the constraint set when the constraints are satisfiable. In some embodiments, solving a set of constraints may include attempting to find one or more solutions that satisfy all the constraints included in the constraint set. In some of these embodiments, the test module 106 may include the solutions with the test results 108. In some embodiments, the solutions may be used to test or debug the code under test 104.

Figure 1B:
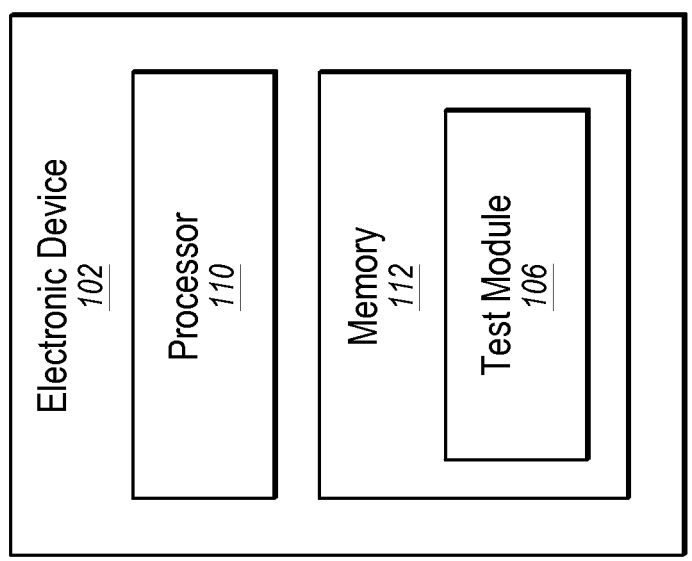
FIG. 1B illustrates an example electronic device that may include a test module configured to test software.

FIG. 1B illustrates an example electronic device 102 that may include the test module 106, according to at least one embodiment described herein. The electronic device 102 may include any suitable system, apparatus, or device configured to test the code under test 104 using the test module 106. The electronic device 102 may include a processor 110 communicatively coupled to a memory 112. In some embodiments, the test module 106 may be embodied in logic or instructions resident in the memory 112 for execution by the processor 110.

The processor 110 may be any suitable special-purpose or general-purpose computer, computing entity, or processing device including various computer hardware or software modules and may be configured to execute instructions stored on any applicable computer-readable storage media. For example, the processor 110 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 1B, it is understood that the processor 110 may include any number of processors configured to perform any number of operations. Additionally, one or more of the processors may be present on a different electronic device. In some embodiments, the processor 110 may interpret and/or execute program instructions and/or process data stored in the memory 112.

The memory 112 may include computer-readable storage media for carrying or having computer-executable instructions or data structures stored thereon. Such computer-readable storage media may be any available media that may be accessed by a general-purpose or special-purpose computer, such as the processor 110. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 110 to perform a certain function or group of functions.

The test module 106 may include instructions and data configured to cause the processor 110 to perform the testing of the code under test 104. Accordingly, in some embodiments, the electronic device 102 may incorporate the test module 106 in the memory 112 as illustrated in FIG. 1B.

FIG. 2 is a diagram of an example flow 200 that may be used with respect to testing event-driven software applications, according to at least one embodiment described herein. The flow 200 may be performed by any suitable system, apparatus, or device. For example, the test module 106 of the electronic device 102 of FIG. 1B may perform one or more of the operations associated with the flow 200. Although illustrated with discrete blocks and phases, the steps and operations associated with one or more of the blocks or phases of the flow 200 may be divided into additional blocks or phases, combined into fewer blocks or phases, or eliminated, depending on the desired implementation.

The flow 200 may be performed with respect to one or more portions of an event-driven software application that may act as code under test, such as the code under test 104 of FIG. 1A. In some embodiments, the flow 200 may begin by receiving one or more initial events 202 that may be associated with the code under test. The initial events may be events that may be obtained from a parser or an interpreter of the source application. Events discovered dynamically during execution of the code under test may also be considered as initial events in some instances. For instance, initial events of a Web application along with their associated source code may be retrieved from the Web browser.

In the illustrated embodiment, the flow 200 may include a pre-processing phase 204, a constraint set determination phase 206, and a test result generation phase 210. The pre-processing phase 204, the constraint set determination phase 206 and the test result generation phase 210 may use the initial events 202 and the associated code under test to output test results 208, which may be analogous to the test results 108 described above with respect to FIG. 1A.

The pre-processing phase 204 may include a block 212 that may correspond to operations associated with determining and aligning event properties of the initial events 202. At block 212, the inputs and the outputs for each of the initial events 202 (referred to as "event inputs" and "event outputs") may be determined. Further, the relationships between event inputs and associated event outputs may be determined. Additionally, in some embodiments, the event inputs and event outputs may be aligned in which associations between the event inputs and the event outputs of the different initial events 202 may be established. In some embodiments, a symbolic input variable may be introduced for each event input and a symbolic output variable may be introduced for each event output. Further, expressions may be generated for the initial events 202 and their associated functions using the symbolic variables and the determined relationships.

For example, the initial events 202 may include events "e1," "e2," "e3," "e4," and "e5." Event "e1" may be associated with a function "f1(a)," which may be represented by the following expression: "f1(a) {a=a+3}." Event "e2" may be associated with a function "f2(a)," which may be represented by the following expression: "f2(a) {a=2a}." Event "e3" may be associated with a function "f3(a)," which may be represented by the following expression: "f3(a) {a=1}." Event "e4" may be associated with a function "f4(a)," which may be represented by the following expression: "f4(a) {a=3a−1}." Event "e5" may be associated with a function "f5(a)," which may be represented by the following expression: "f5(a) {a=2a+6}."

As indicated above, the event outputs and the event inputs of the events "e1," "e2," "e3," "e4," and "e5" may each correspond to a variable "a" such that when a sequence of two or more of the events "e1," "e2," "e3," "e4," and "e5" is performed, the output of one event may be used as the input for another event. As such, associations and relationships between the event inputs and outputs may be determined.

In some embodiments, symbolic input and output variables may be generated for the events "e1," "e2," "e3," "e4," and "e5" based on the relationships between the event inputs and outputs of the events "e1," "e2," "e3," "e4," and "e5." By way of example, a symbolic input variable "a1" and a symbolic output variable "a1'" may be introduced for event "e1;" a symbolic input variable "a2" and a symbolic output variable "a2'" may be introduced for event "e2;" a symbolic input variable "a3" and a symbolic output variable "a3'" may be introduced for event "e3;" a symbolic input variable "a4" and a symbolic output variable "a4'" may be introduced for event "e4;" and a symbolic input variable "a5" and a symbolic output variable "a5'" may be introduced for event "e5."

Additionally, symbolic expressions that represent the relationships between the symbolic input variables and their corresponding symbolic output variables may be generated. For example, an expression "a1→f1→a1'" may be generated that indicates that the value of the symbolic output variable "a1'" may be generated by performing function "f1" with respect to the value of the symbolic input variable "a1." Similarly, expressions "a2→f2→a2'," "a3→f3→a3'," "a4→f4→a4'," and "a5→f5→a5'" may be generated with respect to events "e2," "e3," "e4," and "e5," respectively.

In the above example, the event inputs and the event outputs of the events "e1," "e2," "e3," "e4," and "e5" may all be associated with the variable "a." However, in some instances, the events 202 may have different event inputs and event outputs. As such, in some embodiments, alignment of the event inputs and the event outputs may include performing a union operation with respect to the event inputs and the event outputs of the events 202 such that each event input of each event of the events 202 may correspond to an event input of another event the initial events 202. The union operation may also be performed such that each event output of each event of the events 202 may correspond to an event output of another event of the initial events 202.

For example, an event "e1.1" may be associated with a function "f1.1(a,b)" that may have variables "a" and "b" as input and output variables that may act as the event inputs and outputs of the event "e1.1." Additionally, an event "e2.1" may be associated with a function "f2.1(b,c)" that may have variables "b" and "c" as input and output variables that may act as the event inputs and outputs of the event "e2.1." Therefore, a union operation may be performed with respect to the event inputs and outputs of the events "e1.1" and "e2.1" such that they may each have corresponding event inputs and outputs associated with variables "a," "b," and "c" of the functions "f1.1(a,b)" and "f2.1(b,c)."

In particular, in some embodiments, symbolic input variables "a1.1," "b1.1," and "c1.1" and symbolic output variables "a1.1'," "b1.1'," and "c1.1'" may be generated for the event "e1.1." Similarly, symbolic input variables "a2.1," "b2.1," and "c2.1" and symbolic output variables "a2.1'," "b2.1'," and "c2.1'" may be generated for the event "e2.1." In these and other embodiments, an expression "(a1.1, b1.1, c1.1)→f1.1→(a1.1', b1.1', c1.1')" and an expression "(a2.1, b2.1, c2.1)→f2.1→(a2.1', b2.1', c2.1')" may be generated with respect to the events "e1.1" and "e2.1," respectively. Therefore, the events "e1.1" and "e2.1" may have event inputs and outputs that correspond to each other.

The pre-processing phase 204 may also include a block 214 that may correspond to operations associated with equivalent event detection. During equivalent event detection, it may be determined whether or not two or more events of the initial events 202 are equivalent. Additionally, it may be determined whether or not an event of the initial events 202 is equivalent to an event sequence of the initial events 202. Events may be considered equivalent with each other or event sequences when their inputs, outputs, and associated operations generate substantially the same result. For example, the event "e5," described above, may be equivalent to an event sequence in which event "e1" occurs and then event "e2" occurs because in the illustrated example "f5(a)=(f2(f1(a))."

The pre-processing phase 204 may further include a block 216 that may correspond to operations associated with superfluous event removal. As the name denotes, during superfluous event removal, superfluous events may be removed. Superfluous events may be events that may be equivalent to another event or event sequence. For example, event "e5" may be a superfluous event because it may be equivalent to the event sequence "e1→e2." Another example of a superfluous event may be an event that is equivalent to any one of events "e1," "e2," "e3," or "e4."

Following the pre-processing phase 204, operations may be performed on processed events 218 in the constraint set determination phase 206. The processed events 218 may include all of the initial events 202 in some instances and in other instances may include fewer than all of the initial events 202 due to removal of one or more superfluous events. During the constraint set determination phase 206, a constraint set may be determined based on the processed events 218. The constraint set may enumerate possible event sequences associated with the processed events 218. In some instances, the constraint set may enumerate all the possible event sequences that may be associated with the processed events.

The constraint set determination phase 206 may include a block 220 that corresponds to operations associated with determining sequence-execution constraints. The sequence-execution constraints may constrain the execution orders of the processed events 218. For example, in some embodiments, one event may occur right before another event. As such, the sequence-execution constraints may be determined by determining each of the different possible permutations with respect to pairs of the processed events 218 in which a first-event output of a first event of a pair of events may be used as a second-event input of a second event of the pair. The number of permutations may accordingly constrain the event sequences.

Additionally, in some embodiments, a symbolic order variable may be assigned to each of the processed events 218. In some of these embodiments, the symbolic order variable may be assigned an integer that may indicate a sequence order position of the associated event. By way of example, the symbolic order variable for the first event in an event sequence may be assigned a "1," the second event in an event sequence may be assigned a "2," and so forth.

For example, the possible events 218 may include the events "e1," "e2," "e3," and "e4," described above and the sequence-execution constraints for the events "e1," "e2," "e3," and "e4" may be determined and expressed as follows below. The event "e1" may be assigned a symbolic order variable "t1," the event "e2" may be assigned a symbolic order variable "t2," the event "e3" may be assigned a symbolic order variable "t3," and the event "e4" may be assigned a symbolic order variable "t4." The possible permutations of the sequence orders of different pairs of the events "e1," "e2," "e3," and "e4" may then be determined as well as the corresponding relationships between the applicable symbolic order variables and the applicable symbolic input and output variables. The possible permutations of the sequence orders of the different pairs of events are listed in the first column of Table 1 below, in which the use of the arrow symbol "→" indicates that the event on the left side of the arrow occurs right before the event on the right side of the arrow. Additionally, the second column in Table 1 includes corresponding expressions that indicate the relationships between the symbolic order variables associated with the event-relationship indicated in the first column. Further, the third column in Table 1 includes corresponding expressions that indicate the relationships between the symbolic input variables and the symbolic output variables associated with the event-relationship indicated in the first column.

TABLE 1

| e1 → e2 | t2 = t1 + 1 | a2 = a1' |
| e2 → e1 | t1 = t2 + 1 | a1 = a2' |
| e1 → e3 | t3 = t1 + 1 | a3 = a1' |
| e3 → e1 | t1 = t3 + 1 | a1 = a3' |
| e1 → e4 | t4 = t1 + 1 | a4 = a1' |
| e4 → e1 | t1 = t4 + 1 | a1 = a4' |
| e2 → e3 | t3 = t2 + 1 | a3 = a2' |

TABLE 1-continued

| e3 → e2 | t2 = t3 + 1 | a2 = a3' |
| e2 → e4 | t4 = t2 + 1 | a4 = a2' |
| e4 → e2 | t2 = t4 + 1 | a2 = a4' |
| e3 → e4 | t4 = t3 + 1 | a4 = a3' |
| e4 → e3 | t3 = t4 + 1 | a3 = a4' |

The constraint set determination phase 206 may also include a block 224 that corresponds to operations associated with determining sequence-position constraints. The sequence-position constraints may constrain the positions of the events in possible sequences of events. In some embodiments, the sequence-position constraints may be based on the number of processed events 218 and/or based on only one event being able to be executed at a time. For example, in some embodiments, an event may not have a position in a sequence of events that is larger than the number of possible events in the sequence of events. Additionally, in these or other embodiments, an event may not share a position with another event in a sequence of events such that more than one event may not be executed at the same time. In some embodiments, the sequence-position constraints may be applied to the symbolic order variables that may be assigned to the processed events 218.

For example, in the example when the processed events 218 include the events "e1," "e2," "e3," and "e4," the total number of events may be 4. Therefore, assuming that the symbolic order variable for an event in the first position in an event sequence may be "0," each of the symbolic order variables "t1," "t2," "t3," and "t4" may be constrained as being assigned an integer less than "5" because there are four events. Additionally, none of the symbolic order variables "t1," "t2," "t3," and "t4" may be assigned the same integer. In some instances, the sequence-position constraints associated with the events "e1," "e2," "e3," and "e4" may accordingly be represented by the following expression: "t1≤3∧t2≤3∧t3≤3∧t4≤3∧t1≠t2∧t1≠t3∧t1≠t4∧t2≠t3 ∧t2≠t4∧t3≠t4."

In some embodiments, the sequence-position constraints and/or the sequence-execution constraints may also be based on a control flow of the code under test. For example, in some instances, the control flow of the code under test may dictate that an event "e1.2" always occurs before an event "e2.2" such that a corresponding symbolic order variable "t1.2" of the event "e1.2" may be constrained as having an integer that is less than a corresponding symbolic order variable "t2.2" of the event "e2.2." Additionally, based on the control flow, the permutation where the event "e2.2" occurs right before the event "e1.2" may not be possible based on the control flow and thus may be removed from the list of possible permutations of one event happening right before another event. Therefore, the sequence-execution constraints may be restricted even further based on the control flow such that control flow information may be encoded into the sequence-position and sequence-execution constraints.

As another example, the code under test may have a branch where if a first condition p1 exists, the code under test may proceed from an event "e1.3" to an event "e2.3" but if a second condition p2 exists, the code under test may proceed from the event "e1.3" to an event "e3.3." As such, the permutation associated with the event "e1.3" happening right before the event "e2.3" may also include a stipulation that the first condition p1 be present and the permutation associated with the event "e1.3" happening right before the event "e3.3" may also include a stipulation that the second condition p2 be present. Therefore, the sequence-execution constraints may be restricted even further based on the control flow. Further, a symbolic order variable "t1.3" of the event "e1.3" may be constrained as being less than symbolic order variables "t2.3" and "t3.3" of the events "e2.3" and "e3.3," respectively, e.g., $p1 \Rightarrow t1.3<t2.3$ and $p2 \Rightarrow t1.3<t3.3$, such that the sequence-position constraints may also be limited further by the control flow.

The constraint set determination phase 206 may also include a block 226 that corresponds to operations associated with determining event-relation constraints. The event-relation constraints may indicate and define the relationships between the event inputs of each event of the processed events 218 with respect to their respective event outputs. In some embodiments, the event-relation constraints may be defined with respect to the symbolic input and output variables and the respective functions associated with the processed events 218.

For example, as indicated above, the symbolic input variable "a1" and the symbolic output variable "a1" may be assigned to the event "e1." In addition, the event "e1" may be associated with the function "f1(a)" which may include the expression "a=a+3." As such, an event-relation constraint that defines the relationship between the symbolic input variable "a1" and the symbolic output variable "a1" with respect to the function "f1(a)" may be generated. In particular, in some embodiments, the event-relation constraint for the event "e1" may be expressed as follows: "e1: a1'=a1+3." The same principles may be applied to the events "e2," "e3," and "e4" such that in some embodiments, event-relation constraints for the events "e2," "e3," and "e4" may be as follows: "e2: a2'=2*a2," "e3: a3'=1," and "e4: a4'=3*a4−1."

The constraint set determination phase 206 may additionally include a block 228 that corresponds to operations associated with forming the constraint set. In some embodiments, the constraint set may include the sequence-execution constraints determined at block 220, the sequence-position constrains determined at block 224, and the event-relation constraints determined at block 226.

For example, a constraint set for the events "e1," "e2," "e3," and "e4" may include the following sequence-execution constraints of Table 1: "$(t2=t1+1 \Rightarrow a2=a1') \wedge (t1=t2+1 \Rightarrow a1=a2') \wedge (t3=t1+1 \Rightarrow a3=a1') \wedge (t1=t3+1 \Rightarrow a1=a3') \wedge (t4=t1+1 \Rightarrow a4=a1') \wedge (t1=t4+1 \Rightarrow a1=a4') \wedge (t3=t2+1 \Rightarrow a3=a2') \wedge (t2=t3+1 \Rightarrow a2=a3') \wedge (t4=t2+1 \Rightarrow a4=a2') \wedge (t2=t4+1 \Rightarrow a2=a4') \wedge (t4=t3+1 \Rightarrow a4=a3') \wedge (t3=t4+1 \Rightarrow 3=a4')$." The constraint set may also include the sequence-position constraints: "$t1 \leq 3 \wedge t2 \leq 3 \wedge t3 \leq 3 \wedge t4 \leq 3 \wedge t1 \neq t2 \wedge t1 \neq t3 \wedge t1 \neq t4 \wedge t2 \neq t3 \wedge t2 \neq t4 \wedge t3 \neq t4$" and the event-relation constraints: "e1: a1'=a1+3," "e2: a2'=2*a2," "e3: a3'=1," and "e4: a4'=3*a4−1.". These constraints may encode and define the possible event sequences of the initial events 202 and the processed events 218.

As indicated above, the processed events 218 may be based on the initial events 202 such that the constraint set formed at block 228 may be based on the initial events 202 of the code under test. However, the code under test may include other events that may be discovered after the initial discovery of the initial events 202. Accordingly, in some embodiments, the constraint set determination phase 206 may also include a block 230 that corresponds to operations associated with updating the constraint set that may be formed at block 228 based on new events that may be discovered. In some embodiments, the constraint set may be updated according to a method 300 described below with respect to FIG. 3.

Following the constraint set determination phase 206, operations may be performed on a finalized constraint set 222 in the test generation phase 210. In some instances, the finalized constraint set 222 may include the initial constraint set formed at block 228 and in other instances, the finalized constraint set 222 may include the updated constraint set that may be updated at block 230. Additionally, the finalized constraint set 222 may include the possible event sequences of the code under test in a manner that may limit the event space of the code under test to those event sequences that may actually occur. In contrast, without the finalized constraint set 222, the event space may include any number of event sequences that may be superfluous and/or not possible to achieve.

The test generation phase 210 may include a block 232 that corresponds to operations associated with solving the finalized constraint set 222. The solving of the constraint set may be performed using any suitable constraint solver. For example, in some embodiments, the constraint solver may enumerate all possible values of the symbolic order variables, and may hence enumerate all possible event sequences encoded in the constraints. For instance, the constraint solver may find a valid value assignment to the symbolic order variables, which may indicate a valid event sequence found by the solver.

The test result generation phase 210 may also include a block 234 that corresponds to operations associated with exploring the event space of the code under test based on the solved constraint set. In some embodiments, exploring the event space may include answering queries, performing debugging operations, performing test generation operations, and/or checking the event space. The amount of processing involved in the operations associated with the test result generation phase 210 may be reduced as compared to when performed traditionally because the event space that may be explored may be reduced based on the finalized constraint set 222.

FIG. 3 is a flowchart of an example method 300 of updating a constraint set, according to at least one embodiment described herein. The method 300 may be performed by any suitable system, apparatus, or device. For example, the test module 106 of the electronic device 102 of FIG. 1B may perform one or more of the operations associated with the method 300. Although illustrated with discrete blocks, the steps and operations associated with one or more of the blocks of the method 300 may be divided into additional blocks, combined into fewer blocks, or eliminated, depending on the desired implementation. Additionally, as indicated above, in some embodiments the method 300 may be performed at the block 230 of FIG. 2.

The method 300 may begin at block 302 where code under test may be received. For example, the code under test from which the initial events 202 were derived in the flow 200 may be received at block 302. At block 304, a new event "e" may be discovered. For example, when the code under test is associated with a Web-based application, the new event "e" may be discovered by a Web browser when a new Web page is opened. As another example, when the code under test is associated with an Android® based application, the associated Android® runtime may discover the new event "e" when a new screen is shown. The new event "e" may be an event that may not have been previously discovered. For example, in the example where the initial events 202 include the events "e1," "e2," "e3," "e4," and "e5," the new event "e" may be a new event "e6" that may not have been initially discovered.

At block 306, it may be determined whether or not the new event "e" is superfluous with respect to the constraint set that may be updated. For example, it may be determined whether the new event "e" is superfluous with respect to the events that are used to form the constraint set. In some embodiments, it may be determined whether the new event is superfluous by determining whether the functionality of the new event "e" may be obtained by an event sequence encoding in the constraint set. If it may be obtained, it may be determined that the new event "e" is superfluous, if not, it may be determined that the constraint set may be updated with constraints associated with the new event "e."

By way of example, the event "e6" may be associated with a function "f6(a)" which may include the following operations: "a=3a+8." To check whether "e6" is equivalent to some event sequence encoding in the constraint set (denoted by "T" in the expression below), the constraint set may then be augmented as illustrated in the following expression: "T∧(a'1=3a0+8∨ a'2=3a0+8∨ a'3=3a0+8 ∨ a'4=3a0+8)," where "a0=(t1=0? a1:(t2=0? a2: (t3=0? a3: a4)))." The above expression may result in the following solution: "t1=0, t2=2, t3=3, t4=1; (e1→e4→e2→e3)" in which "e1→e4" may be equivalent to the event "e6." Therefore, the event "e6" may be considered superfluous with respect to the constraint set "T."

As another example, a new event "e7" may be discovered at block 304 and the new event "e7" may be associated with a function "f7(a)," which may include the following operations: "a=4a−2λ." In this example, the constraint set (denoted by "T" again in the expression below) may then be augmented as illustrated in the following expression: "T ∧(a'1=4a0−2∨ a'2=4a0−2∨ a'3=4a0−2∨ a'4=4a0−2)," which may be unsatisfiable for the above "a0." Therefore, the event "e7" may not be considered superfluous with respect to the constraint set "T."

When the new event "e" is considered superfluous, the method 300 may proceed to block 308, where the new event "e" may be discarded or ignored. Following block 308, the method 300 may return to block 304.

When the new event "e" is not considered superfluous, the method 300 may proceed to block 310. At block 310, the constraint set may be updated incrementally for the new event "e." In the incremental update, one or more of the old constraints of the constraint set may be kept and new constraints that are related to the new event "e" may be determined and added to the constraint set. For example, new sequence-execution constraints may be determined and then added as permutations with respect to pairs that include the new event "e." Further, the sequence-position constraints may be updated to reflect the addition of the new event "e" as another possible event in an event sequence. Further, event-relation constraints associated with the new event "e" may be determined and added to the constraint set.

By way of example, with respect to the constraint set associated with the events "e1," "e2," "e3," and "e4," the sequence-execution constraints indicated in Table 1 above may be augmented to include sequence-execution constraints associated with the event "e7," as illustrated in Table 2 below. Also, as illustrated below, the constraints not related to "e7" may be kept intact.

TABLE 2

| e1 → e2 | t2 = t1 + 1 | a2 = a1' |
| e2 → e1 | t1 = t2 + 1 | a1 = a2' |
| e1 → e3 | t3 = t1 + 1 | a3 = a1' |
| e3 → e1 | t1 = t3 + 1 | a1 = a3' |

TABLE 2-continued

| e1 → e4 | t4 = t1 + 1 | a4 = a1' |
| e4 → e1 | t1 = t4 + 1 | a1 = a4' |
| e2 → e3 | t3 = t2 + 1 | a3 = a2' |
| e3 → e2 | t2 = t3 + 1 | a2 = a3' |
| e2 → e4 | t4 = t2 + 1 | a4 = a2' |
| e4 → e2 | t2 = t4 + 1 | a2 = a4' |
| e3 → e4 | t4 = t3 + 1 | a4 = a3' |
| e4 → e3 | t3 = t4 + 1 | a3 = a4' |
| e1 → e7 | t7 = t1 + 1 | a7 = a1' |
| e7 → e1 | t1 = t7 + 1 | a1 = a7' |
| e2 → e7 | t7 = t2 + 1 | a7 = a2' |
| e7 → e2 | t2 = t7 + 1 | a2 = a7' |
| e3 → e7 | t7 = t3 + 1 | a7 = a3' |
| e7 → e3 | t3 = t7 + 1 | a3 = a7' |
| e4 → e7 | t7 = t4 + 1 | a7 = a4' |
| e7 → e4 | t4 = t7 + 1 | a4 = a7' |

Further, the sequence-position constraints may be updated because the number of possible events in an event sequence may be increased from four to five. For example, the sequence-position constraints placed on the symbolic position variables associated with the events "e1," "e2," "e3," "e4," and "e7" may be modified such that they may now be expressed as: "t1≤4∧t2≤4∧t3≤4∧t4≤4∧t1≠t2∧t1≠t3 ∧t1≠t4∧t2≠t3∧t2≠t4∧t3≠t4∧t7≤4∧t7≠t1∧t7≠t2∧t7≠t3 ∧t7≠t4."

Additionally, an event-relation constraint for the event "e7" may be determined and generated as "e7: a7'=4*a7−2." The event-relation constraint "e7: a7'=4*a7−2" may then be added to the event-relation constraints "e1: a1'=a1+3," "e2: a2'=2*a2," "e3: a3'=1," and "e4: a4'=3*a4−1" of the constraint set.

Further, in some embodiments, the new event "e" may be executed only after another event has been executed based on the control flow of the associated code under test. Therefore, in some embodiments, the block 310 may include updating or modifying the sequence-execution constraints and/or the sequence-position constraints based on the control flow, such as described above.

Following block 310, the method 300 may return to block 304 where another new event "e" may be discovered. Accordingly, the method 300 may be used to update a constraint set based on other events that may be discovered after initial events have been discovered.

In some embodiments, the encoding of the event sequences may be queried to check properties. The conjunction of a property and the constraint set "T" may be solved by a constraint solver during the check of the properties. If the constraint solver finds a solution, then the property may be considered valid. For example, a property "Is there a 4-event sequence such that a's value is 10 in the end?" may be checked by attempting to solve the constraints "T∧ ((t1=3∧a'1=10)∨(t2=3∧a'2=10)∨(t3=3∧a'3=10)∨(t4=3/ \a'4=10)". For this particular example, the constraint solver may return a solution "t1=2, t2=3, t3=0, t4=1", indicating that the event sequence "e3→e4→e1→e2" satisfies this property and that the property is valid. As another example, a property "Is there a sequence such that a's value can ever be 0 after the execution (initially a=1)?" may be checked by attempting to solve the constraints "T∧ (a'1=0∨a'2=0∨ a'3=0∨a'4=0)." For this particular example, the constraint solver may not be able to find a solution. As such, this property may not hold (for all possible event sequences defined by the constraints) and may be considered invalid.

One skilled in the art will appreciate that, for these and other processes and methods disclosed herein, the functions performed in the processes and methods may be implemented in differing order. Furthermore, the outlined steps and actions are only provided as examples, and some of the steps and actions may be optional, combined into fewer steps and actions, or expanded into additional steps and actions without detracting from the essence of the disclosed embodiments.

As indicated above, the embodiments described herein may include the use of a special purpose or general purpose computer (e.g., the processor 110 of FIG. 1B) including various computer hardware or software modules, as discussed in greater detail below. Further, as indicated above, embodiments described herein may be implemented using computer-readable media (e.g., the memory 112 of FIG. 1B) for carrying or having computer-executable instructions or data structures stored thereon.

As used herein, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
    determining sequence-execution constraints that constrain execution orders of a plurality of events of an event-driven software application;
    determining sequence-position constraints that constrain positions of the plurality of events in one or more possible event sequences of the plurality of events;
    determining event-relation constraints that each indicates a relationship between an event input and an event output of each of the plurality of events, each of the event-relation constraints being defined with respect to a respective symbolic input variable "a1" of its respective event input that is in code of the event-driven software application, a respective symbolic output variable "a1'" of its respective event output that is in the code of the event-driven software application, and a respective software function "f1" of the code of the event-driven software application that is associated with the respective event and that includes the respective symbolic input variable and the respective symbolic output variable, the event-relation constraints being defined based on a respective expression "a1→f1→a1'" that indicates that a value of the respective symbolic output variable "a1'" is generated by performing function "f1" with respect to a value of the respective symbolic input variable "a1";
    forming a constraint set that enumerates the one or more possible event sequences and that includes the sequence-execution constraints, the sequence-position constraints, and the event-relation constraints;
    encoding control flow information of the one or more possible event sequences into the constraint set;
    solving the constraint set to determine one or more event sequences that satisfy the constraint set; and
    performing test generation operations on the one or more event sequences that satisfy the constraint set.

2. The method of claim 1, further comprising aligning event inputs and event outputs of the plurality of events such that each event input of each event of the plurality of events corresponds to an event input of another event of the plurality of events and such that each event output of each event of the plurality of events corresponds to an event output of another event of the plurality of events.

3. The method of claim 1, wherein determining the sequence-execution constraints is based on possible permutations with respect to pairs of the plurality of events being sequentially executed in which a first-event output of a first event of a pair in a permutation of the possible permutations is used as a second-event input of a second event of the pair in the permutation.

4. The method of claim 1, wherein determining the event-relation constraints is based on one or more of a number of events in the plurality of events and only one event of the plurality of events being executed at one time with respect to a control flow of the event-driven software application.

5. The method of claim 1, further comprising:
    introducing, for each of the plurality of events, a symbolic order variable associated with a position of its corresponding event in an execution order of the plurality of events; and
    constraining the symbolic order variables based on the sequence-execution constraints and the sequence-position constraints.

6. The method of claim 1, further comprising removing superfluous events from a group of events to obtain the plurality of events.

7. The method of claim 1, further comprising:
    updating one or more of the sequence-execution constraints, the sequence-position constraints, and the event-relation constraints based on a new event; and
    modifying the constraint set based on the updating of the one or more of the sequence-execution constraints, the sequence-position constraints, and the event-relation constraints.

8. The method of claim 1, further comprising performing one or more of the following operations on the event-driven software application based on the test generation operations: debugging operations, checking operations, and testing operations.

9. Non-transitory computer-readable storage media including computer-executable instructions configured to cause a system to perform operations, the operations comprising:
    determining sequence-execution constraints that constrain execution orders of a plurality of events of an event-driven software application;

determining sequence-position constraints that constrain positions of the plurality of events in one or more possible event sequences of the plurality of events;

determining event-relation constraints that each indicates a relationship between an event input and an event output of each of the plurality of events, each of the event-relation constraints being defined with respect to a respective symbolic input variable "a1" of its respective event input that is in code of the event-driven software application, a respective symbolic output variable "a1'" of its respective event output that is in the code of the event-driven software application, and a respective software function "f1" of the code of the event-driven software application that is associated with the respective event and that includes the respective symbolic input variable and the respective symbolic output variable, the event-relation constraints being defined based on a respective expression "a1→f1→a1'" that indicates that a value of the respective symbolic output variable "a1'" is generated by performing function "f1" with respect to a value of the respective symbolic input variable "a1";

forming a constraint set that enumerates the one or more possible event sequences and that includes the sequence-execution constraints, the sequence-position constraints, and the event-relation constraints;

encoding control flow information of the one or more possible event sequences into the constraint set;

solving the constraint set to determine one or more event sequences that satisfy the constraint set; and performing test generation operations on the one or more event sequences that satisfy the constraint set.

10. The non-transitory computer-readable storage media of claim 9, wherein the operations further comprise aligning event inputs and event outputs of the plurality of events such that each event input of each event of the plurality of events corresponds to an event input of another event of the plurality of events and such that each event output of each event of the plurality of events corresponds to an event output of another event of the plurality of events.

11. The non-transitory computer-readable storage media of claim 9, wherein determining the sequence-execution constraints is based on possible permutations with respect to pairs of the plurality of events being sequentially executed in which a first-event output of a first event of a pair in a permutation of the possible permutations is used as a second-event input of a second event of the pair in the permutation.

12. The non-transitory computer-readable storage media of claim 9, wherein determining the event-relation constraints is based on one or more of a number of events in the plurality of events and only one event of the plurality of events being executed at one time with respect to a control flow of the event-driven software application.

13. The non-transitory computer-readable storage media of claim 9, wherein the operations further comprise:

introducing, for each of the plurality of events, a symbolic order variable associated with a position of its corresponding event in an execution order of the plurality of events; and constraining the symbolic order variables based on the sequence-execution constraints and the sequence-position constraints.

14. The non-transitory computer-readable storage media of claim 9, wherein the operations further comprise removing superfluous events from a group of events to obtain the plurality of events.

15. The non-transitory computer-readable storage media of claim 9, wherein the operations further comprise:

updating one or more of the sequence-execution constraints, the sequence-position constraints, and the event-relation constraints based on a new event; and modifying the constraint set based on the updating of the one or more of the sequence-execution constraints, the sequence-position constraints, and the event-relation constraints.

16. The non-transitory computer-readable storage media of claim 9, wherein the operations further comprise performing one or more of the following operations on the event-driven software application based on the test generation operations: debugging operations, checking operations, and testing operations.

* * * * *